United States Patent [19]

Heidenreich et al.

[11] Patent Number: 4,567,822

[45] Date of Patent: Feb. 4, 1986

[54] APPARATUS AND METHOD FOR DECORATING ARTICLES

[75] Inventors: Horst Heidenreich, Kirchlengern; Knut Kammann, Bünde, both of Fed. Rep. of Germany

[73] Assignee: Werner Kammann Maschinenfabrik GmbH, Bünde, Fed. Rep. of Germany

[21] Appl. No.: 645,382

[22] Filed: Aug. 29, 1984

[30] Foreign Application Priority Data

Aug. 27, 1983 [DE] Fed. Rep. of Germany ....... 3330927

[51] Int. Cl.⁴ .................... B65G 47/00; B41F 17/00
[52] U.S. Cl. ................................ 101/38 A; 198/742; 198/465.1
[58] Field of Search ................... 101/38 R, 38 A, 39, 101/40, 126; 198/472, 580, 742

[56] References Cited

U.S. PATENT DOCUMENTS

| | | |
|---|---|---|
| 2,881,699 | 4/1959 | Hakogi . |
| 3,010,371 | 11/1961 | Riedel et al. ................... 198/742 X |
| 3,062,353 | 11/1962 | Opperthauser ................ 198/742 X |
| 3,417,852 | 12/1968 | Kidd ............................. 198/742 X |
| 3,478,859 | 11/1969 | Krempel et al. .................. 198/472 |
| 3,809,208 | 5/1974 | Shields .......................... 198/472 X |
| 4,005,649 | 1/1975 | Strauch et al. . |
| 4,048,914 | 9/1977 | Kammann et al. . |
| 4,172,517 | 10/1979 | Kobayasi ....................... 198/742 X |
| 4,271,957 | 6/1981 | Osborne ........................ 198/742 X |
| 4,398,627 | 8/1983 | Saccani ........................ 101/38 A X |

FOREIGN PATENT DOCUMENTS 2417373 10/1974 Fed. Rep. of Germany ... 101/38 A

Primary Examiner—Clifford D. Crowder
Attorney, Agent, or Firm—Panitch Schwarze Jacobs & Nadel

[57] ABSTRACT

An apparatus and method for decorating articles is provided with article carriers which are advanced with a stepwise motion along a guide track on a circulatory conveyor path whereby each article is passed, on the same carrier, through successive treatment stations. The article carriers are releasably connectible to a reciprocally movable conveyor means which, upon movement thereof in the conveying direction, is engageable with the article carriers, while upon movement thereof in the opposite direction to the conveying direction, it is out of engagement with the article carriers. The conveying stepping motions and the residence times of the articles in the various stations are adaptable to the respective conditions obtaining. The guide track may be subdivided into two portions which are disposed at a spacing from each other, and the spacing between the two portions can be bridged across by reciprocal movable sections carrying the article carriers.

18 Claims, 18 Drawing Figures

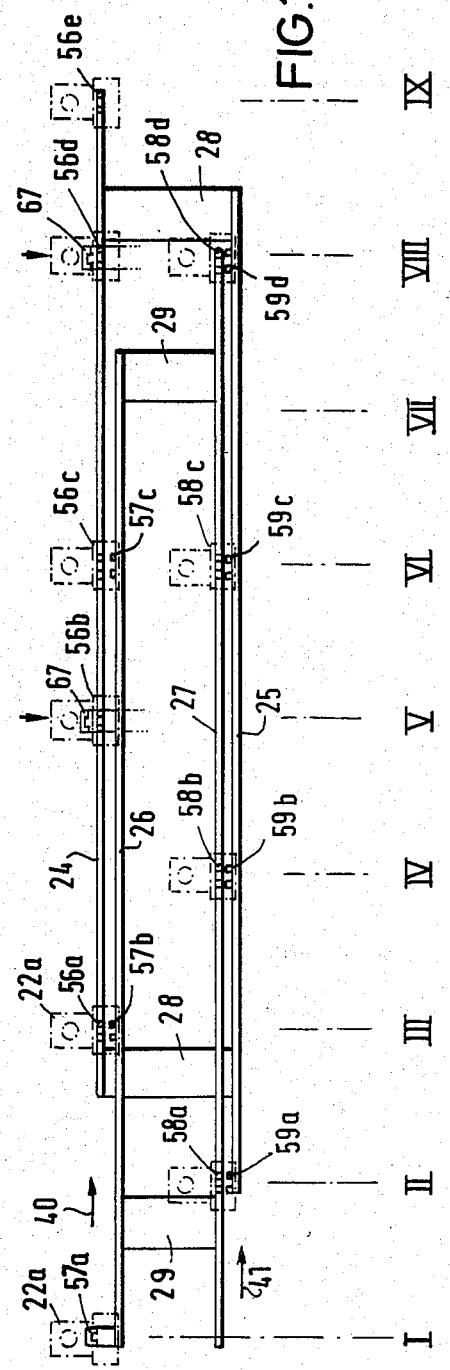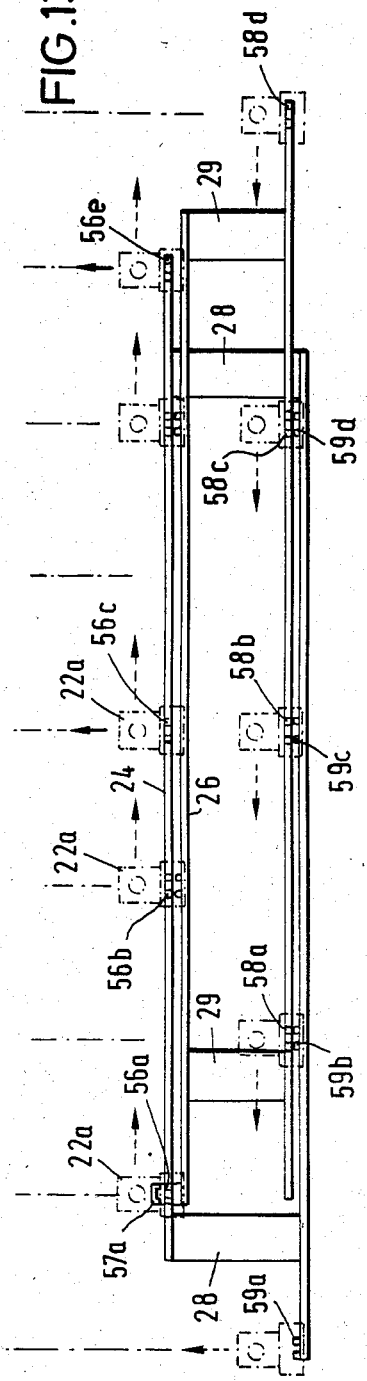

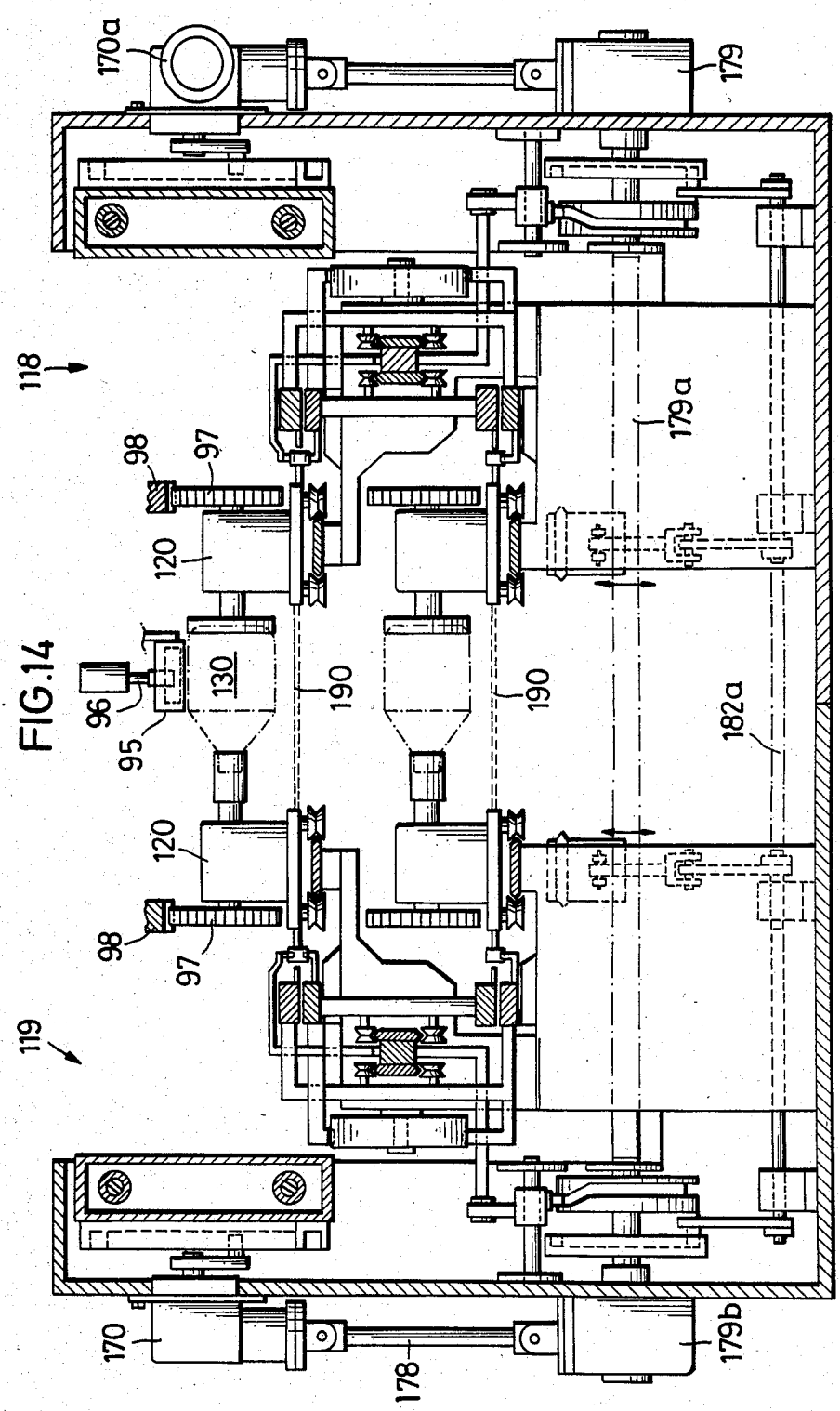

APPARATUS AND METHOD FOR DECORATING ARTICLES

BACKGROUND OF THE INVENTION

This invention relates generally to an apparatus and method for decorating articles and more specifically an apparatus wherein the articles are each carried by a respective article carrier which is passed through the apparatus by a conveyor means with a stepwise motion on a circulatory conveyor path along a guide track, each article being released from its carrier after passing at least one treatment station.

Decoration includes for example applying printing, colouring, a label or the like to an article, or treating an article at its surface to produce a desired effect thereat.

In one form of apparatus for decorating articles by a screen printing process (specification U.S. Pat. No. 2,881,699) a continuously circulating conveyor means in the form of a chain carries entrainment members which are positively or form-lockingly connected to the article holders. The article holders are transported along a circulatory conveyor path, the course of which corresponds to that of the conveyor chain, continuously over the major part of the extent thereof. It is only in the region of the screen printing station that the article holders and therewith also the articles carried thereby are transported with a stepwise motion, for the purpose of permitting the articles, which are of non-round cross-section, to be printed therearound. The stepwise forward conveying movement of the article holders in the printing station is achieved by virtue of the entrainment members which remain permanently in engagement with the article holders performing a relative movement with respect to the article holders along curve-like surfaces on the article holders. The use of a continuously moving conveyor means means that this known apparatus which in addition only provides one treatment station in the form of a screen printing station is subject to certain limitations in regard to the utility thereof. Due to the circulating conveyor means, the speed of conveying movement and the residence time in the printing station are fixed within narrow limits. Although it is possible to vary the speed of conveying movement and also the residence time in the treatment station, within certain limits, by suitable design in respect of the article holder curve or cam surfaces that co-operate with the entrainment members, nonetheless that involves a very high level of expenditure as all article holders must be suitably constructed at their curve or cam surfaces which co-operate with the entrainment members. The degree of freedom is also restricted by virtue of the fact that the configuration of the curve or cam members is linked to the cross-sectional shape of the article to be printed. There is no possibility of any alterations in the mode of operation of this known apparatus, for example in regard to different residence times in given treatment stations. In addition, the stepwise conveying movement of the articles is tied in to the non-round cross-sectional shape thereof.

German laid-open application (DE-OS) No. 24 02 836 and specification U.S. Pat. No. 4,005,649 disclose a screen printing apparatus having a plurality of treatment stations, in which there is also a continuously circulating conveyor means in the form of a chain, to which the article carriers are fixedly mounted. In that arrangement, the article or object to be printed is embraced by one of the article carriers when the article moves into the machine, and is transported by that carrier through the entire machine, that is to say, through all the treatment stations therein. The advantage of that known apparatus is that, once the article to be printed has been engaged by an article carrier, it remains in its relative position with respect thereto. In that way, it is readily possible to provide that the article, from the outset, occupies a given position in the individual printing stations, and in particular a given angular position in relation to the respective printing means, so that there is no need for any special arrangement for specifically aligning the article with respect to each printing means. On the other hand, with that known apparatus, there is no possibility of the article being allowed to stay in given stations for a longer period than in other stations. That means that the apparatus is less suitable for example for printing on articles comprising plastics as in that respect it is always necessary for the print applied in the respective last station to be allowed to dry before the next printing operation can be carried out. Under the circumstances involved here, the arrangement of drying stations of that kind would mean that the known apparatus would be very long.

The last-mentioned problem is avoided in a screen printing machine which is disclosed in German laid-open application (DE-OS) No. 25 30 360 and specification U.S. Pat. No. 4,048,914, as the latter is provided with a plurality of reciprocably movable article carriers which are connected fixedly to the drive means, and the article, in the course of its being conveyed through the machine, is freed by an article carrier and picked up again by the following article carrier. That stepwise conveying movement affords the possibility of taking account of certain requirements in regard to residence time in the individual stations, for example in such a way that the operation of printing on the articles is carried out during a step in the conveying movement and the subsequent operation of drying the print on the article is performed in a station in which the article remains for a given period of time, between two steps in the conveying motion. On the other hand however, that advantage is achieved at the expense of the disadvantage that, when more than two prints or impressions are to be applied to the article in the one or more printing stations following the first printing station, the articles must first be realigned so that the individual prints to be applied thereto are in the correct position relative to each other.

SUMMARY OF THE INVENTION

An object of the present invention is to provide an apparatus and method for decorating articles in succession, wherein each article remains carried by the same carrier in its movement through the apparatus.

Another object of the invention is to provide an apparatus and method for decorating a succession of articles by stepwise motion thereof through the apparatus, with adjustability in respect of the article conveying movements and the residence times thereof in treatment stations, to adapt to the operating conditions and circumstances involved.

These and other objects are achieved by an apparatus and method for decorating articles comprising at least one article treatment station, a plurality of carriers for respective articles, and a conveyor means for conveying the carriers through the apparatus with a stepping motion along a guide track, and thus through the treatment station or stations for decoration of the successive articles therein. The carriers are releasably connectible to the conveyor means which is capable of reciprocating movement, and is engaged therewith upon movement thereof in the conveying direction and disengaged therefrom in the opposite direction of movements.

Therefore, the apparatus according to the invention, particularly as described in greater detail hereinafter, enjoys advantages of the previous apparatuses referred to hereinbefore; on the one hand, as in the case of the apparatus provided with a continuously circulating conveyor means, the article or object can be carried by the same article carrier during the conveying movement through a plurality of treatment stations and possibly through the entire apparatus, that article carrier, after release of the article, being returned to the beginning of the apparatus, for example to the station at which the articles are delivered thereto, once again in a similar fashion to the apparatuses which are provided with a continuously circulating conveyor assembly. Thus, the present apparatus also provides for a circulatory movement of the carriers or holders on a conveyor path which is closed in itself, but without the conveyor means also moving along that circulatory path, the releasable connection between the article carriers on the one hand and the conveyor means on the other hand permitting stepwise forward conveying movement of the article carriers, with the advantages already referred to above, namely more flexible adaptation to the respective requirements involved, with the conveyor means being of a simple design configuration.

A construction which has been found to be particularly advantageous is one in which the guide track comprises two portions which are disposed at a spacing from each other, wherein the spacing between the two portions can be bridged across by reciprocally movable sections for transfer of the carriers from one guide track portion to another. The guide track portions are advantageously at a vertical spacing from each other, with the reciprocal sections being correspondingly reciprocal in a vertical direction.

In accordance with a further embodiment, each guide track portion may have associated therewith a conveyor means in the form of at least one reciprocable entrainment bar or strip which extends substantially parallel to the respective portion and which is reciprocable transversely with respect to the stroke movements thereof, which provide for transportation of the article carriers, in order to bring the entrainment bar or strip into and out of engagement with article carriers disposed on the respective associated track portion. Advantageously, the two entrainment bars which are each associated with a respective one of the two portions of the guide track are connected to form a frame structure-like component by connecting elements, wherein the one entrainment bar, upon movement in the one direction, is in engagement with article carriers of the one portion of the guide track and the other entrainment bar, upon movement in the other direction, is in engagement with article carriers of the other portion of the guide track. In other words, each stroke movement of the frame structure-like component can be utilised to produce a conveying stepping movement. It has been found that a particularly advantageous embodiment is one in which two entrainment bars are associated with each portion of the guide track, with the two entrainment bars being movable in opposite directions relative to each other. Generally, it will be desirable for the bars to be arranged one above the other and at a small spacing from each other. If the two entrainment bars, which are each moved in the same direction, of the two respective portions of the conveyor track, are interconnected by way of connecting elements, then that arrangement provides two frame structure-like components which are movable in opposite relationship to each other. The advantage of such a design is that, in each conveying stroke movement of the two frame structure-like components, it is possible to provide for forward conveying motion of the article carriers so that, in contrast to the situation where only one entrainment bar is used per section of the guide track, the conveying stepping movements of the article carriers can follow each other directly, although that is not necessary. That substantially increases the through-put of articles to be treated, per unit of time.

The entrainment bars may carry entrainment members by way of which the releasable connections to the article carriers can be made. In that respect, the arrangement of the entrainment members, which are advantageously mounted adjustably, can be selected in accordance with the respective requirements involved. Thus, it is possible for at least some of the entrainment members to be mounted on the respective entrainment bar carrying same, at spacings from each other which correspond to the stroke movement performed by the respective entrainment bars. In that case, in two successive stepping movements of the conveyor motion, the article carrier will be moved on by two adjacent entrainment members of the same entrainment bar, while between the stepping movements of the conveying motion, there is a period of time that corresponds to the duration of a stepping motion and during which the article carrier is not moved forward. On the other hand, the arrangement may be such that at least some of the entrainment members are disposed on the respective entrainment bar carrying same, at spacings from each other which correspond to double the stroke movement performed by the entrainment bars. In that arrangement, the article carrier would be advanced in directly successive stepping movements of the conveying motion. By suitably selecting the spacings between the entrainment members on the individual entrainment bars, it is possible for the forward movement of the article carriers to be adapted to the respective requirements arising in the treatment stations.

In addition, the entrainment members of the respective entrainment bars associated with the same section of the guide track may be of different lengths parallel to the reciprocating movements which take place in the transverse directions, wherein the shorter entrainment members are in engagement with the respective projection or extension portion, in the limit position of being advanced towards the article carriers, and the longer entrainment members are in engagement with the respective projection or extension portion, in the oppositely disposed limit position.

In the stations in which the article carrier stays between two conveying stepping movements during the duration of a conveying stepping movement, it is possible to provide a locking or restraining element which secures the article carrier in its position and which is advantageously also mounted on the common carrier element which is engaged by a drive member for transmitting the reciprocating movements in the transverse directions.

The apparatus according to the invention has in principle the circulatory guide track of those known apparatuses which are provided with a circulatory chain. In that respect, the upper portion of the guide track corresponds to the upper run of such a chain and the lower portion of the guide track corresponds to the lower run. However, a major advantage in comparison with the known construction is that it is readily possible also to use the lower portion for carrying out treatment or processing operations. In the case of the conventional apparatuses which are provided with chains, that generally involves serious difficulties, and may even be virtually impossible. The stepping conveying movements which are performed by the individual article carriers in the individual portions of the guide track do not need to occur synchronously with each other. On the contrary, for example when the lower portion of the guide track is not being used for treating or processing the articles, it is readily possible for the article carriers to be returned over the quickest path to the starting position or the position in which they are returned to the level of the upper portion of the guide track, by the vertically reciprocal section of the guide track. Moreover, said sections of the guide track may also be provided with locking or restraining elements for the article carriers which are for example of a carriage-like nature. That may be effected by resilient or spring means being mounted on the guides of the movable sections of the guide track, for the article carriers, with the article carriers or rollers thereof engaging into said spring means.

Further features, objects and advantages of the present invention will become apparent from the following detailed description.

BRIEF DESCRIPTION OF THE DRAWINGS

FIGS. 13A and 13B are views illustrating the cooperation of entrainment bars and the conveying movement of article carriers which is produced thereby, FIG. 14 is a view corresponding to that shown in FIG. 1, of a machine for decorating articles wherein two apparatuses as shown in FIGS. 1 to 13 are arranged in mutually oppositely disposed relationship for holding the articles on both sides thereof.

DESCRIPTION OF PREFERRED EMBODIMENTS

Figure 1:
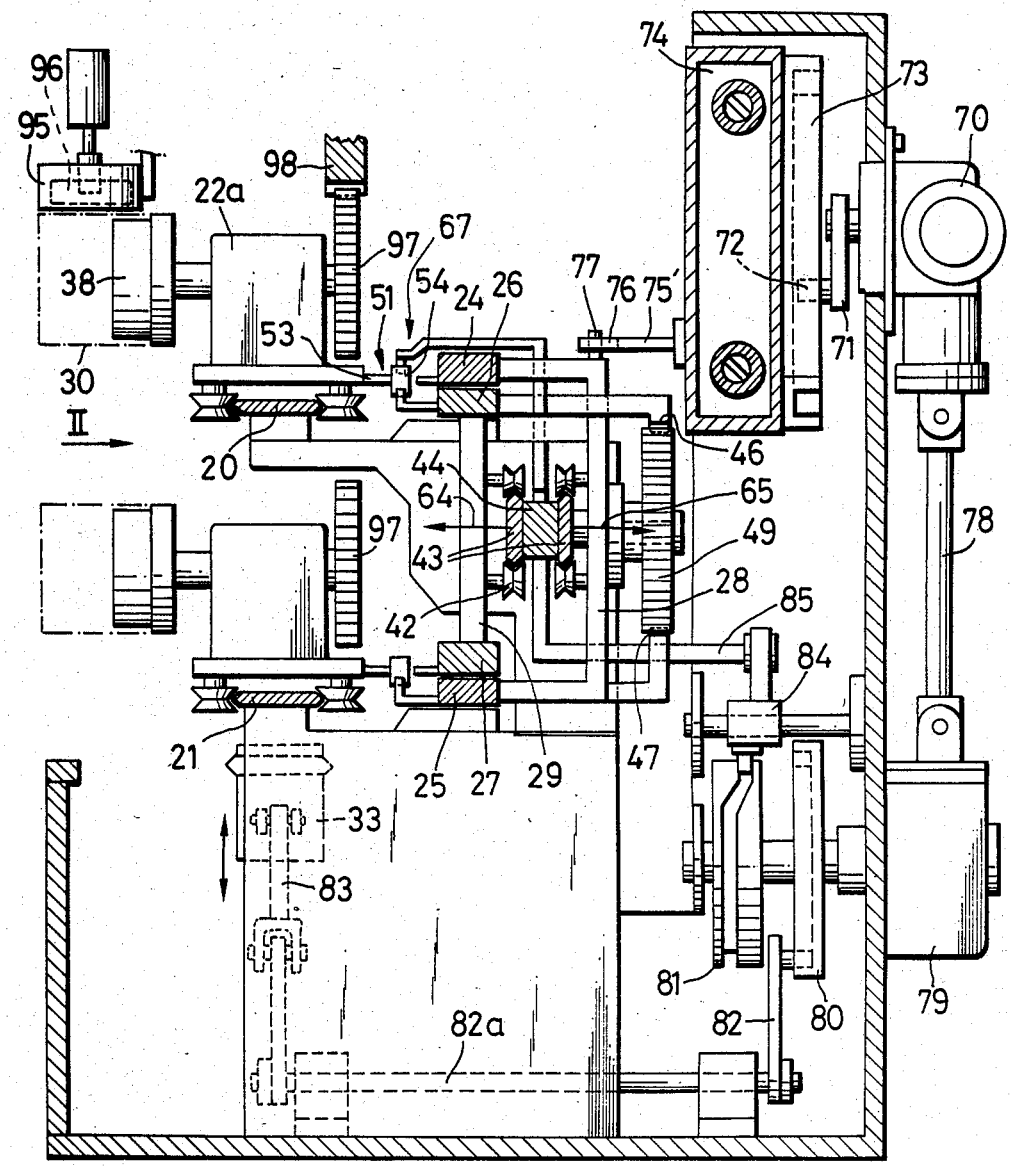
FIG. 1 shows a front view in partial section of an apparatus illustrated as a screen printing machine wherein the article to be treated therein is held at one side.
Figure 2:
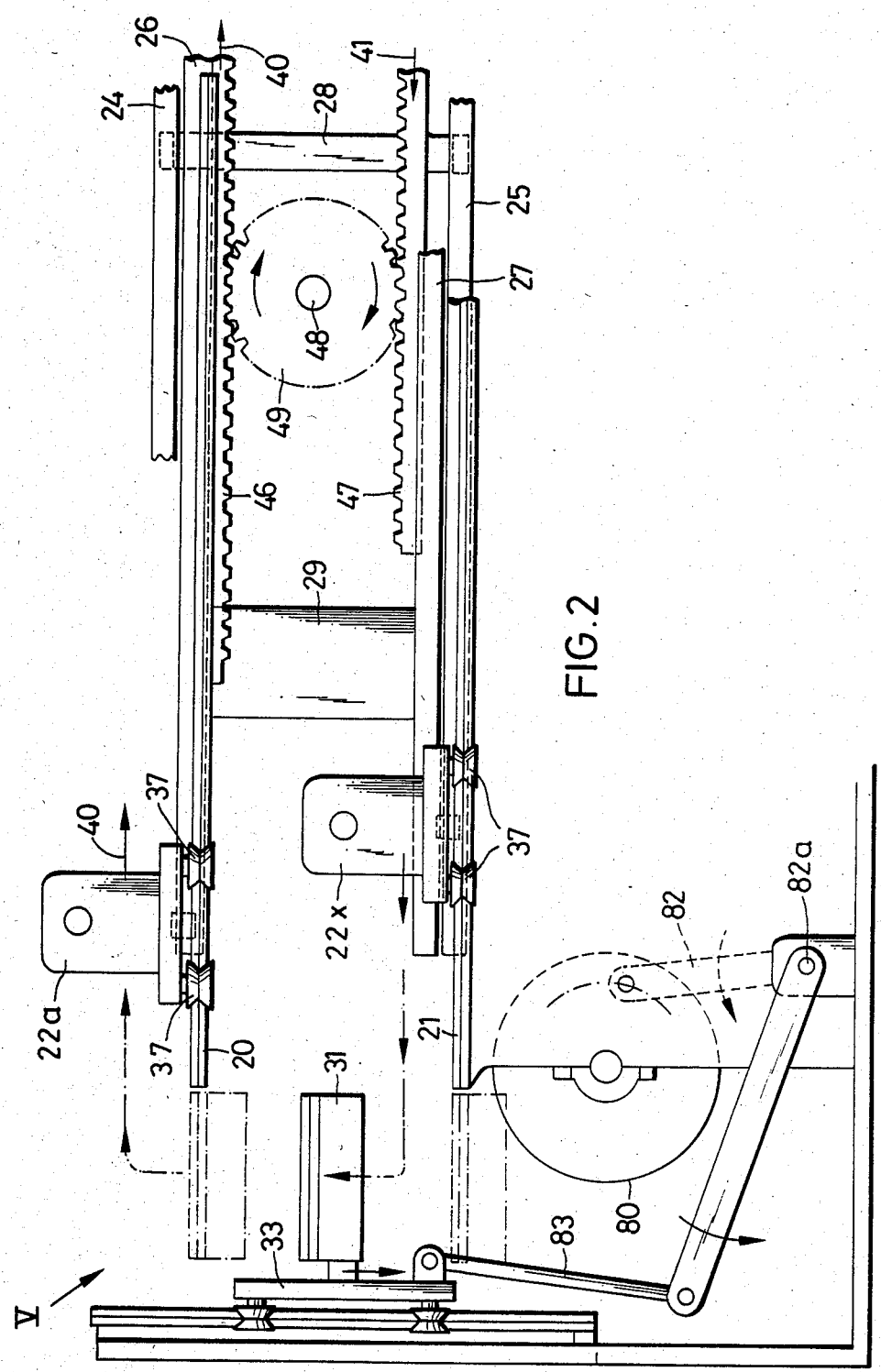
FIG. 2 shows a side view of part of the FIG. 1 machine.
Figure 3:
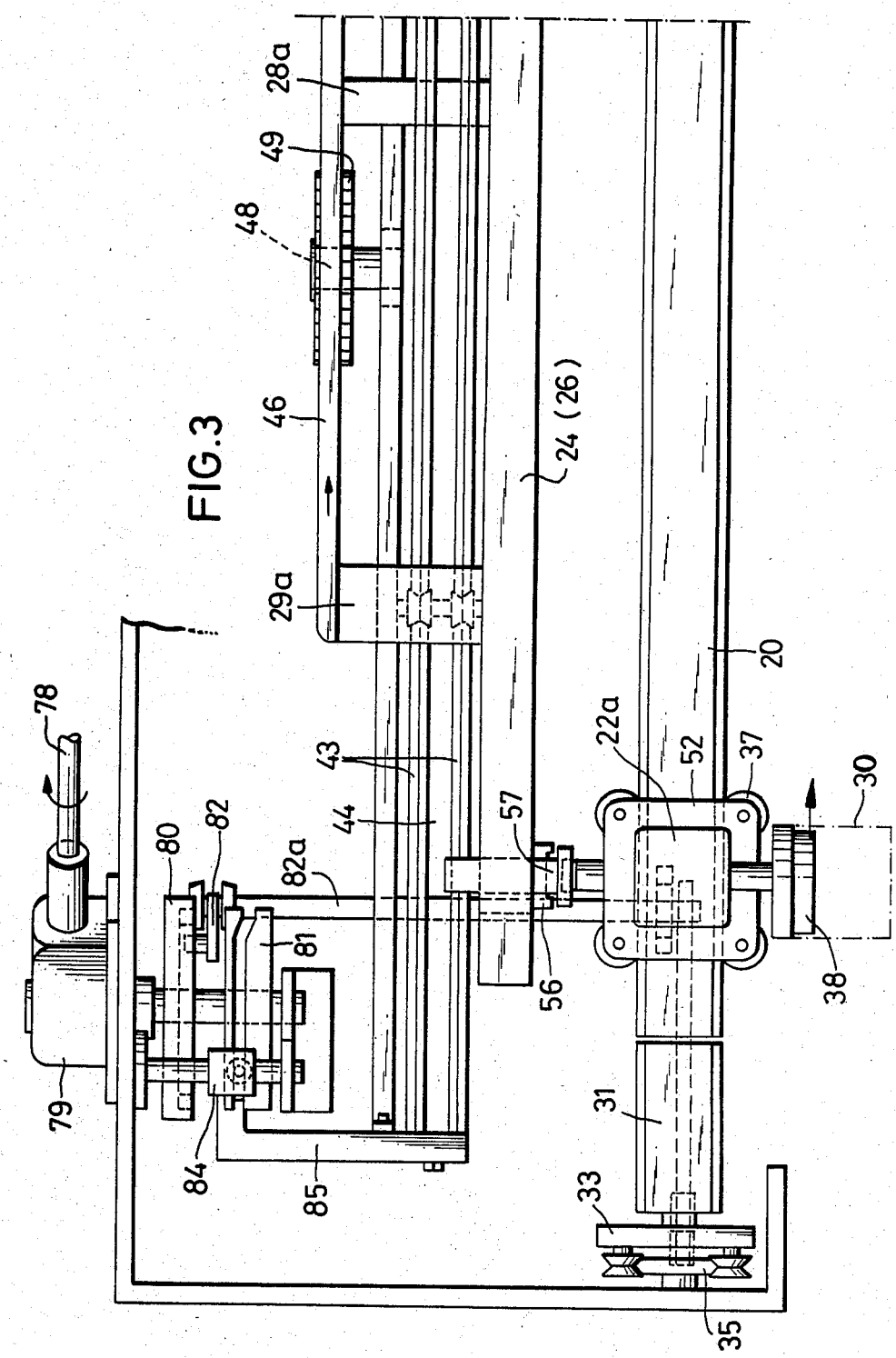
FIG. 3 shows a plan view corresponding to the view shown in FIG. 2.
Figure 4:
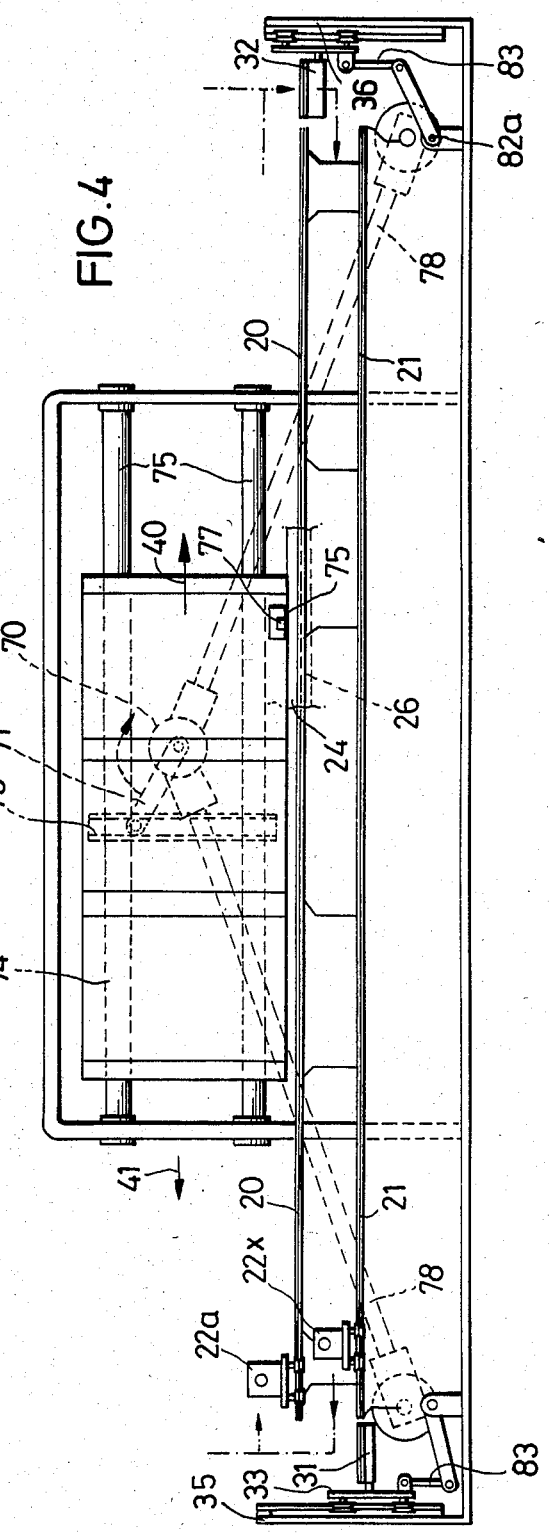
FIG. 4 is a side view of elements of the apparatus required for drive power transmission therein.

Referring to FIGS. 1–13A and 13B, the embodiment illustrated therein is provided with a guide track which comprises two portions 20 and 21 which are disposed at a vertical spacing from each other. Article or object carriers 22a to 22x are displaceable with a stepwise motion along the portions 20 and 21 respectively. The apparatus also has four entrainment bars or strips 24, 25 and 26, 27 which are reciprocally displaceable parallel to the portions 20 and 21 respectively and which are each combined together in pairs to form frame structure-like components, such that the two entrainment bars 24 and 25 on the one hand and the two entrainment bars 26 and 27 on the other hand are joined together by way of respective connecting elements 28 and 29 respectively, and are carried thereby. The entrainment bars 24 and 26 are associated with the upper portion 20 of the guide track while the entrainment bars 25 and 27 are associated with the lower portion 21 thereof. All entrainment bars 24–27 are arranged in a vertical plane at the side of the portions 20 and 21 or the article carriers 22a–22x, which is remote from the side of the article carriers at which there are holding members 38 for the articles 30 to be treated, which in this case are in the nature of a glass or beaker.

Disposed at each of the two ends of the portions 20 and 21 of the guide track is a respective section 31 and 32 respectively (see FIGS. 2–6) which is carried by a respective holding member 33 and 34 which is reciprocal on vertical guides 35 and 36 respectively, by a distance corresponding to the spacing between the two portions 20 and 21. In that arrangement, the guide means may be designed in the same manner as in the case of the article carriers 22a–22x which are provided with guide rollers 37 co-operating with the longitudinal edges of the portions 20 and 21 and the movable sections 31 and 32.

A similar arrangement is also to be found in respect of the entrainment bars 24, 25 and 26, 27 which are reciprocal along the guide track portions 20 and 21 respectively, that is to say, in the directions indicated by the arrows 40 and 41 respectively. The connecting elements 28 and 29 which respectively interconnect the entrainment bars are provided with guide rollers at 42 which are guided on guide bars as at 43. The latter are carried by a common carrier or by common carrier portions 44 which is or are arranged parallel to the entrainment bars 24–27, in a plane extending between the bars 26 and 27. The two connecting elements 28 and 29 are each provided with a respective gear rack 46 and 47 respectively. The two gear racks 46 and 47 mesh with a common gear 49 which performs the oscillating rotary movements corresponding to the reciprocating movements of the entrainment bars 24–27, and which is mounted to the carrier 44.

Each of the article carriers 22a–22x is provided, at its side which is towards the entrainment bars 24–27, with a projection or extension portion 51 which is of substantially T-shaped configuration, in such a way that a substantially horizontal web portion 53 extends from the article carrier, for example a base plate 52 which carries the guide rollers 37 thereof. At its free end, the horizontal portion 53 has a vertical flange 54 which projects upwardly and downwardly beyond the portion 53. The projection 51 is arranged at a level at which, in regard to the article carrier 22a–22x which is on the upper portion 20 of the guide track, the projection 51 is in opposite relationship to the two upper entrainment bars 24 and 26 which are only slightly vertically spaced from each other and, in regard to the article carrier on the lower portion 21, the projection 51 is in opposite relationship to the two entrainment bars 25 and 27 which are arranged relative to each other in the same manner.

The entrainment bars 24–27 are in turn provided with entrainment members 56a–56e, 57a–57c, 58a–58d and 59a–59d respectively. The entrainment members 56a–56e and 58a–58d respectively on the bars 24 and 27 are of a U-shape or forked configuration in plan view; in other words, they each have two projections 61 which extend horizontally from the respectively associated entrainment bar 24 or 27 and which, in the direction of movement 40 or 41 of the entrainment bars, are at a spacing from each other which possibly decreases in an inward direction and which corresponds to the dimension of the flange 54 on the projection 51 on the article carriers 22a–22x. Thus, the two projections 61 of each entrainment member 56a–56e and 58a–58d respectively may matchingly accommodate the flange 54 of each article carrier therebetween.

The entrainment members 57b and 57c, and 59a–59d of the entrainment bars 26 and 25 respectively each comprise a web portion 62 which extends from the associated entrainment bar in a direction towards the article carrier and the free end of which carries two upwardly directed projections 63; the spacing between the projections 63, which possibly decreases in an inward direction, is of such a size that they can matchingly accommodate the flange 54 of the projection 51 on the article carrier therebetween. In particular FIGS. 9–12 show that the horizontal extent of the entrainment members in a direction towards the projection 51 of the article carrier is different, with the result that entrainment members of a bar 24 or 27 are in engagement with projections 51 of respective oppositely disposed article carriers whereas the entrainment members of the respective other associated bars 26 and 25 respectively are out of engagement. In the position of the components as shown in FIGS. 1 and 12, the entrainment members 57a–57c on the bar 26, being provided with the upwardly directed projections 63, and the similarly fashioned entrainment members 59a–59d on the bar 25, are in engagement with the respective projections 51, whereas the forked entrainment members, which only extend horizontally, on the two bars 24 and 27, are disengaged from the respective projections 51.

So that the entrainment members can be brought into and out of engagement with the projections 51 on the article carriers, the frame structures comprising the entrainment bars 24, 25 and 26, 27, and the respectively associated connecting elements 28 and 29 with guide rollers 42, as well as the gear racks 46 and 47, the gear 49 and the carrier bar member 44, are combined to form a structural unit which is reciprocal in the horizontal plane in the direction indicated by the arrows 64 and 65 (see FIG. 1). The distance covered in the above-mentioned reciprocating movements is relatively short and approximately corresponds to the spacing in the plane of movement between the projections 61 of the entrainment members 56a to 56e and 58a to 58d respectively on the one hand and the projections 63 of the entrainment members 57a to 57c, 59a and 59d respectively.

Figure 9:
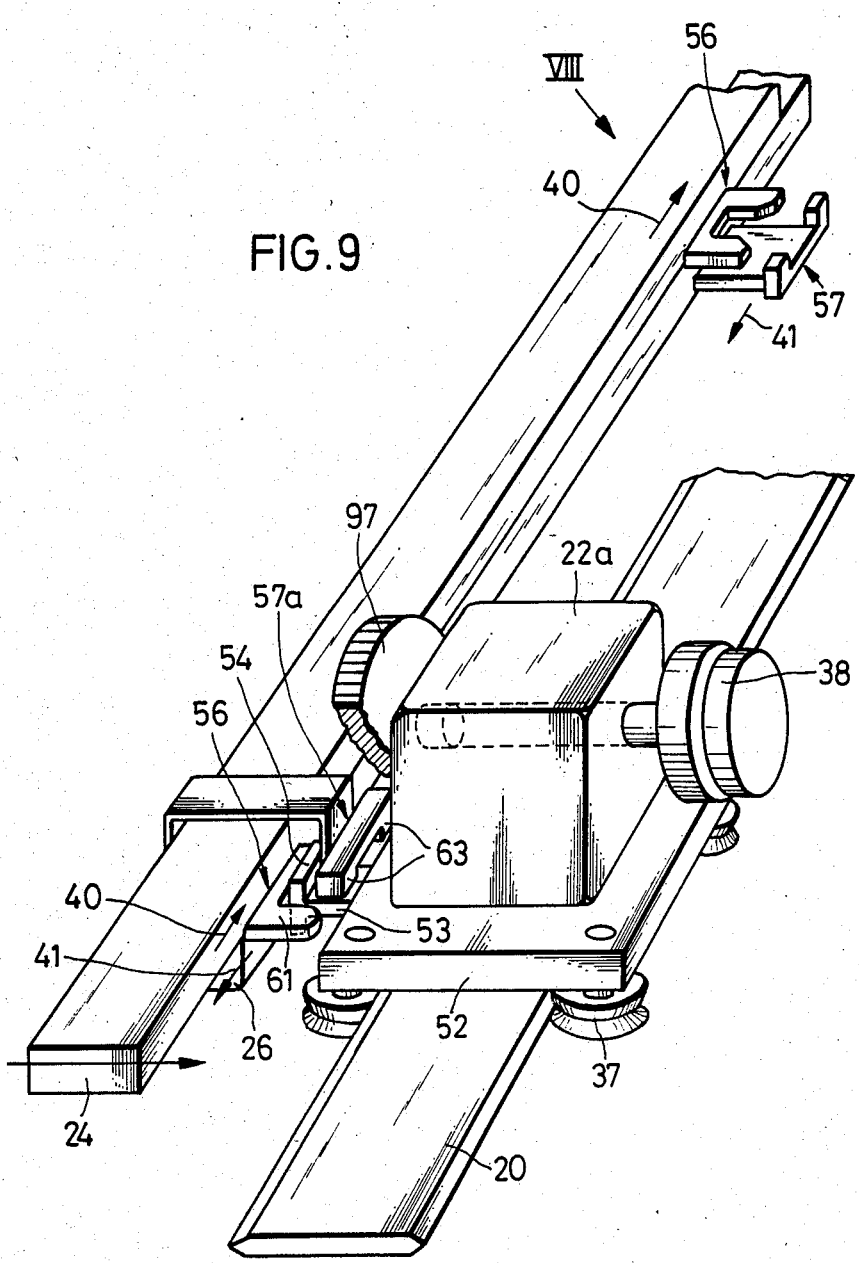
FIG. 9 is a view corresponding to FIG. 6 but with the article carrier in a different position.
Figure 10:
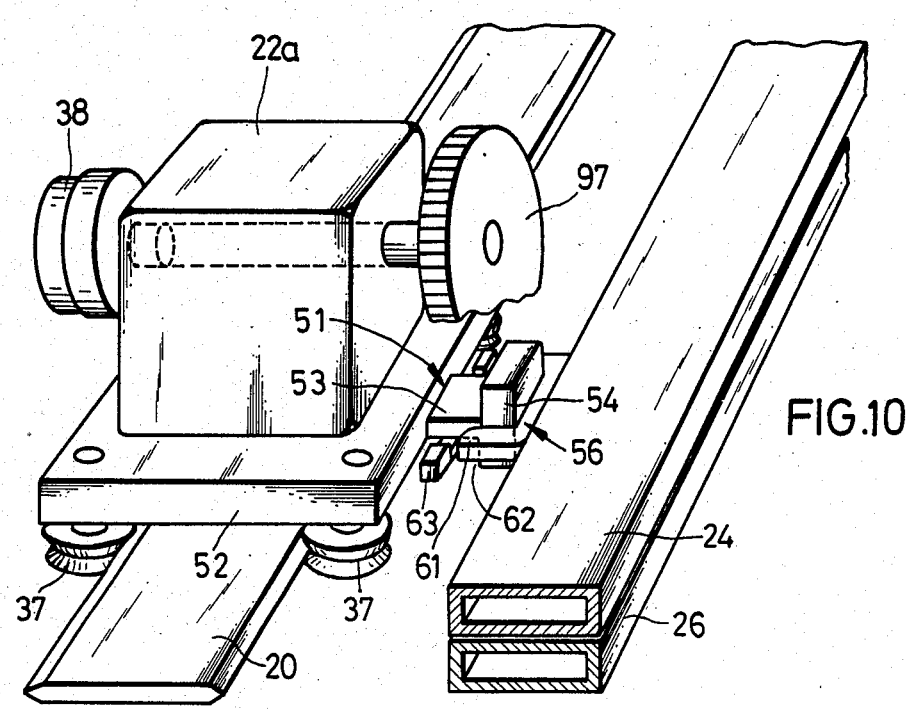
FIG. 10 is a view corresponding to FIG. 7 but viewed from the other side of the article carrier.
Figure 11:
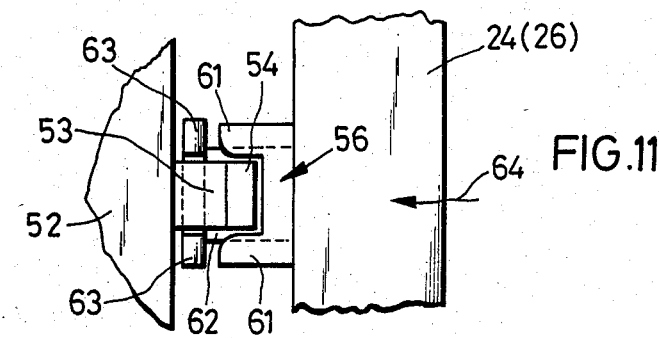
FIG. 11 is a plan view of a portion from a detail shown in FIG. 10.
Figure 12:
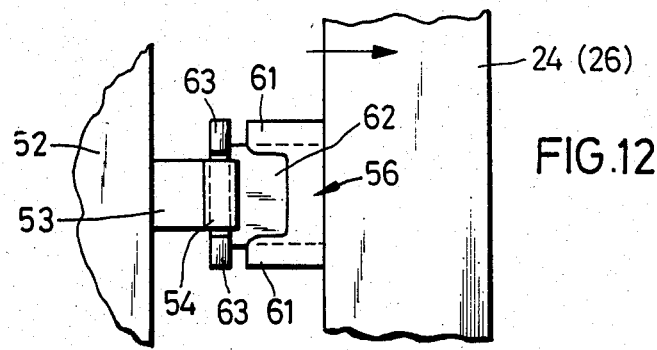
FIG. 12 is a view corresponding to FIG. 11 but showing a number of components in different positions.

Reference is now made to FIGS. 5–12 which show in particular the relative association of the entrainment members of the two respectively co-operating entrainment bars 24, 26 and 27, 25. In FIGS. 10 and 11, the entrainment bars are in their position in which they are advanced towards the portions 20, 21 of the guide track, that is to say, in the direction indicated by the arrow 64 in FIG. 1, being the position in which the horizontal projections 61 of the entrainment members on the entrainment bar 24 laterally engage around the flange 54 of the projection 51 of the respective oppositely disposed article carrier 22a–22x on the guide track portion 20. With all the entrainment bars 24, 26 and 27, 25 in that advanced position, the entrainment members 57a–57c of the entrainment bar 26 are disposed in the region of the portion 53 of the respective oppositely disposed article carrier 22a–22x. The upwardly directed projections 63 of the entrainment members 57a–57c are of such a size, that is to say, are so short, that they do not embrace the portion 53. In other words, upon movement of the bar 26 in the direction of the arrows 40 or 41, the entrainment members 57a–57c are moved underneath the portions 53 of the respective article carriers 22a–22x which are in the region of such movement, without coming into contact with such carriers. When that happens therefore, no article carriers are entrained by the entrainment members 57b and 57c. On the contrary, in the above-mentioned position of the entrainment bars in which they are advanced in the direction indicated by the arrow 64 (see FIG. 1), entrainment members 56a–56e, as shown in FIG. 9, are in engagement with the flanges 54 of article carriers 22a–22x which are on the portion 20, so that movement of the entrainment bar 24 results in entrainment of those article carriers 22a–22x which are in a condition of engagement with a respective one of the entrainment members 56a–56c.

Movement of the unit comprising the entrainment bars 24, 25, 26 and 27, the associated connecting elements 28 and 29 and the carrier bar member 44, away from the guide track, being therefore in the direction indicated by the arrow 65 in FIG. 1, has the result that the components take up the position shown for example in FIGS. 1, 5, 6 and 12 of the drawings, in which the projections 63 of the entrainment members 57a–57c are now in engagement with the flanges 54 of a respective article carrier 22a–22x so that, upon corresponding movement of the entrainment bar 26, those article carriers are also entrained. FIGS. 1 and 12 in particular show that the entrainment members 56a–56b of the entrainment bar 24 are disposed laterally beside the flanges 54 of the article carriers 22a–22x and therefore do not project into the region of movement of the flanges or any other part of the projections 51.

A similar situation also arises in regard to the co-operation of the entrainment members of the two lower entrainment bars 25 and 27 with the article carriers which are disposed on the guide track portion 21. The two entrainment bars 25, 27 are moved synchronously with the respectively associated upper entrainment bar 24 and 26 respectively, but the entrainment members of the entrainment bars 25 and 27 are in a condition of engagement when the entrainment members of the respectively associated upper entrainment bars 24 and 26 are in a disengaged condition, and vice-versa, as the conveying movement of the article carriers 22a–22x on the lower guide track portion 21 takes place in the opposite direction as indicated by reference numeral 41, that is to say, with respect to the movement on the guide track portion 20 in the direction indicated by the arrow 40, in the return stroke movement in the direction indicated by the arrow 41. For that reason, the entrainment members of the two entrainment bars of that frame structure are also of different designs.

It has been explained hereinbefore that the kind of connection made between the gear 49 on the one hand and the entrainment bars 24, 25 and 26, 27 which are combined together to form respective frame structures, by way of the gear racks 46 and 47, provides for movement of the two frame structures in opposite directions, with the result that the two respectively adjacent entrainment bars 24, 26 and 27, 28 respectively also perform movements in the opposite directions, as indicated by the arrows 40 and 41. Those movements provide for stepwise conveying motion of the article carriers 22a–22x. In contrast, all entrainment bars 24, 25 and 26, 27 perform the movements that take place transversely with respect to the conveying movements 40 and 41, in the directions indicated by the arrows 64 and 65, for the purposes of bringing the entrainment members 56a–e, 57a–c, 58a–d and 59a–d into and out of engagement with the projections 51 on the article carriers 22a–22x.

In addition, at the positions of the portion 20 of the guide track, there are provided locking or restraining elements 67, in the stations in which the article carriers 22aa–22x do not change in position between two successive conveying stepping movements in respect of the entrainment bars, with the articles being treated, for example dried, in that station. The elements 67 are also carried by the carrier 44. They also perform the reciprocating movements in the directions indicated by the arrows 64 and 65, without however participating in the oppositely directed movements of the entrainment bars 24–27 in the directions indicated by the arrows 40 and 41. Each element 67 is similar in design to the entrainment members on the entrainment bars 25 and 26, and essentially comprises a web portion 68 from which two projections 69 extend downwardly. The two projections 69 define a fork-like configuration and the spacing thereof, as in the case of the projections 63 of the above-mentioned entrainment members 57b–c and 59a–c, is adapted to the dimensions of the flanges 54 of the projections 51 on the article carriers 22a–22x. In the embodiment illustrated herein, the restraining elements 67 are only associated with the upper portion 20 as it is only there that treatment stations for the articles 30 are disposed. Furthermore, the projections 69 of the elements 67 align with the projections 63 of the entrainment members 57a–57c so that the elements 67 are in engagement with the respectively associated article carrier 22a or 22x, or the flange 54 thereof, when the entrainment members 56a–e are out of engagement therewith. That means that, in the region of the respective restraining elements 67, there is no entrainment member on the entrainment bar 26 or the entrainment members on that bar are disposed at a greater spacing in the region of the restraining element 67, as the element 67 occupies its operative position of restraining or locking an article carrier when the entrainment members 57a–57c on the entrainment bar 26 also occupy their operative position of providing an entrainment action.

If in contrast the restraining elements 67 were so arranged that they aligned with the entrainment members on the entrainment bar 24, the arrangement would have to be reversed, in such a way therefore that the entrainment members on the entrainment bar 24 are at a greater spacing from each other in the respective region. On the other hand, the entrainment members in the entrainment bar whose entrainment members are not aligned with the restraining elements 67 are to be arranged, in the region of the latter, at a shorter spacing corresponding to the stroke movements performed by both entrainment bars.

The apparatus is driven by way of a central transmission arrangement 70 with which there is associated an electric motor (not shown). One of the output shafts of the transmission arrangement 70 carries a crank arm 71 with a roller 72 mounted at the free end thereof. The roller 72 is disposed in engagement with a vertical guide 73 which is mounted on a carriage or slide 74. The carriage 74 is guided on horizontal struts or spars 75. Accordingly, rotary movement of the crank arm 71 results in reciprocating motion of the carriage 74 in the directions indicated by the arrows 40 and 41.

At its side which is towards the guide track portions 20 and 21, the carriage 74 is provided with a fixedly mounted arm 75', whose end portion 76 that is remote from the carriage 74 is of a forked configuration or is provided with a slot therein and is engaged with a pin 77 which is fixedly mounted to the connecting element 28 of the two entrainment bars 24 and 25. The arm 75' and the pin 77 transmit the reciprocating movement of the carriage 74 to the frame structure formed by the components 24, 25 and 28 and from there by way of the rack 46 to the gear 49 which in turn drives the frame structure formed by the two entrainment bars 26 and 27 and the connecting elements 29.

The central transmission arrangement 70 is also connected by way of a respective universally jointed or cardan shaft 78 to two transmission units 79, each of which is arranged adjacent to a respective end of the apparatus. Fixed on the output shaft to each of the two transmission units 79 are two cam discs or plates 80 and 81. The cam disc 80, by way of an output lever 82 and a shaft 82a with linkage 83 connected thereto, produces the upward and downward movements of the holding members 33 and 34 for the movable sections 31 and 32 respectively, between the two portions 20 and 21 of the guide track.

Associated with the other cam disc 81 is an output member 84 which, by way of a transverse member 85, produces the reciprocating movements in the directions indicated by the arrows 64 and 65 in FIG. 1, of the unit including the components 24–27, 28, 29 and 49. The slot or forked configuration 76 in the arm 75' carried by the carriage 74 serves to permit the pin 77 which is engaged therewith, to perform those reciprocating movements.

By virtue of the individual drive means being derived from the central transmission arrangement 70, in the above-described manner, it is readily possible to provide for matching of the movements performed by the individual components of the apparatus, without complicated control assemblies or the like being necessary for that purpose.

The mode of operation of the apparatus will now be described with reference to FIGS. 1–13A and 13B.

Figure 5:
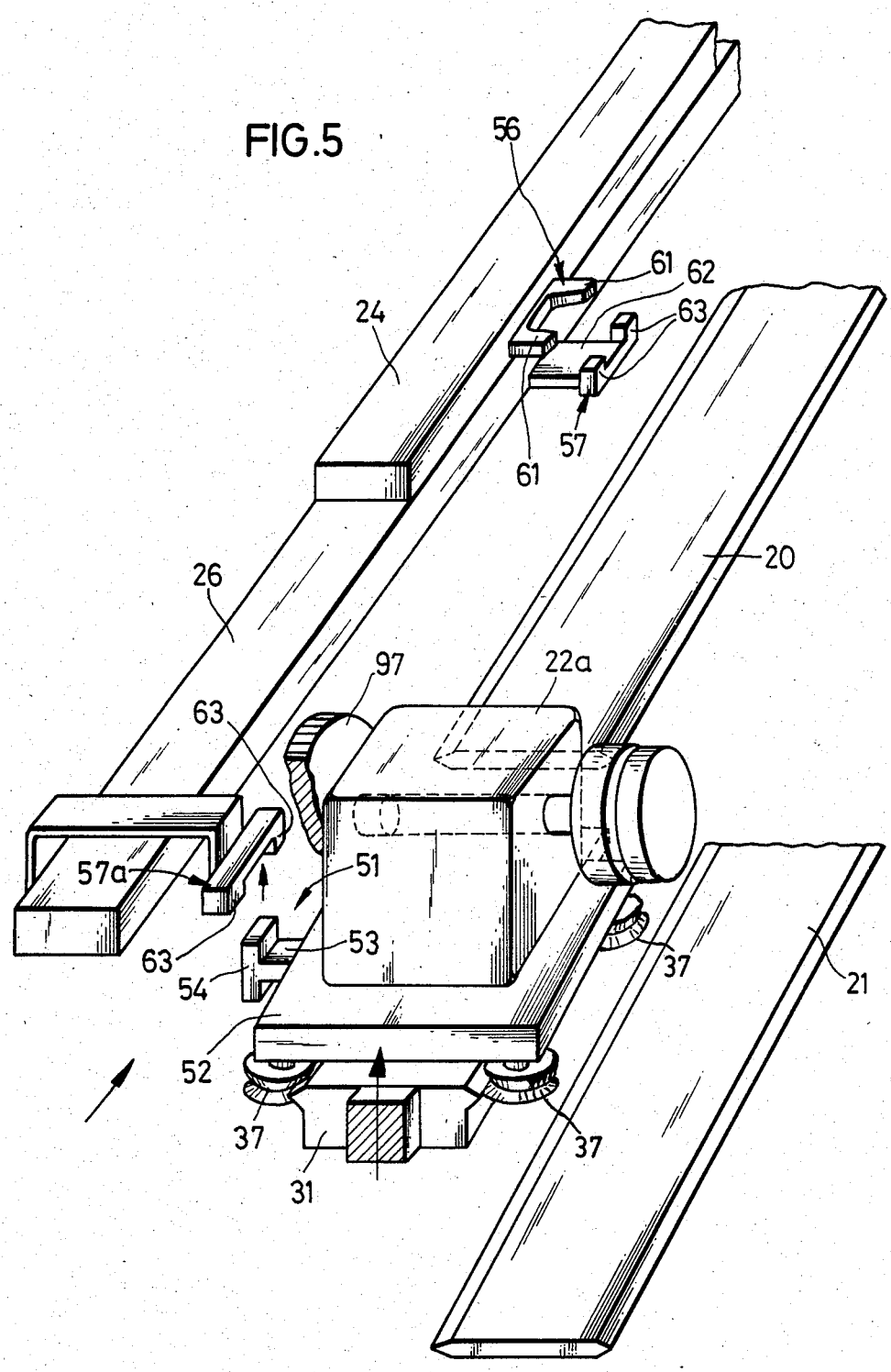
FIG. 5 is a perspective view of a portion of one of the two end regions of the machine, with the means for vertical conveying movement of the article carriers.
Figure 6:
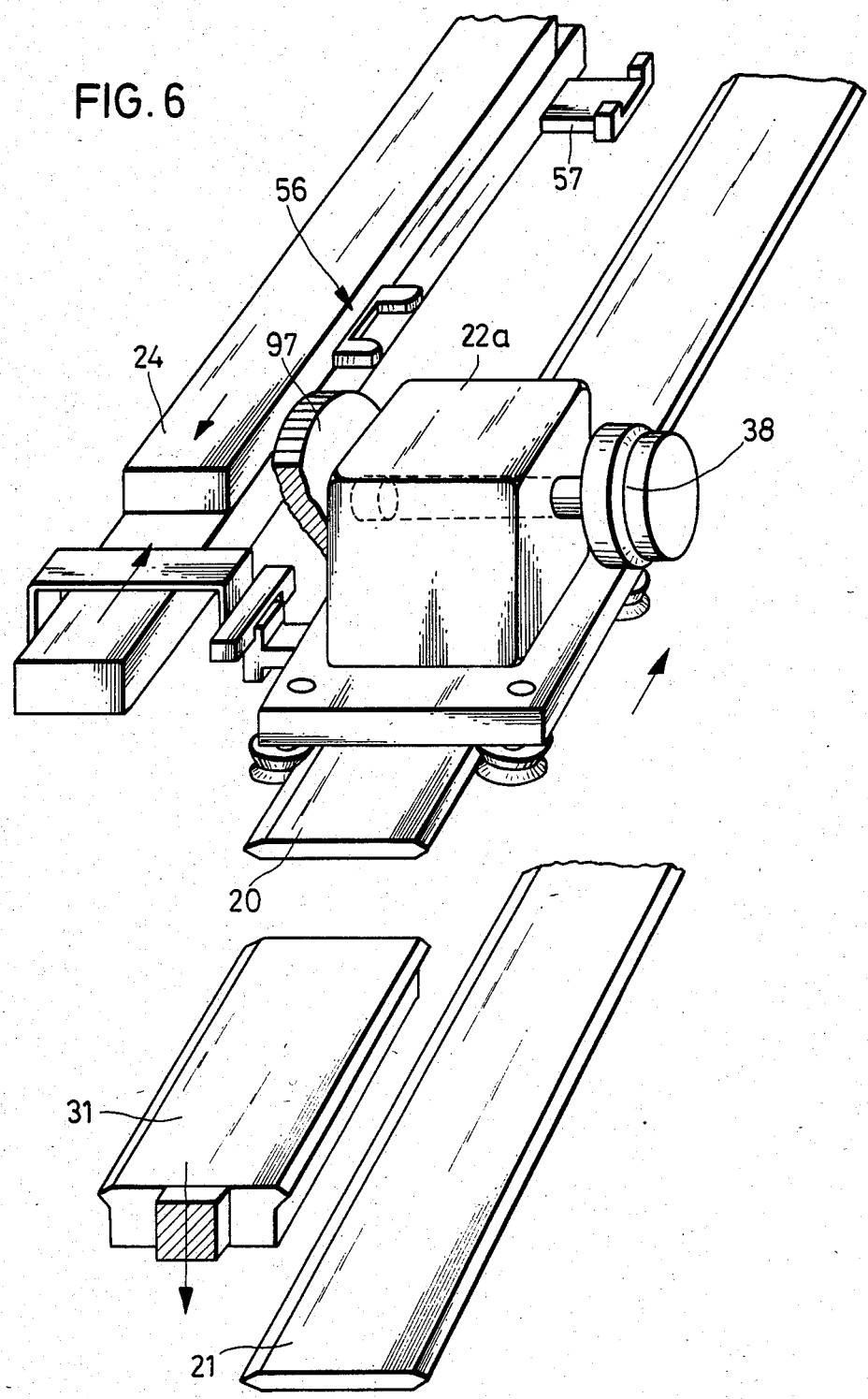
FIG. 6 shows a view corresponding to that shown in FIG. 5, with some components in different positions.
Figure 7:
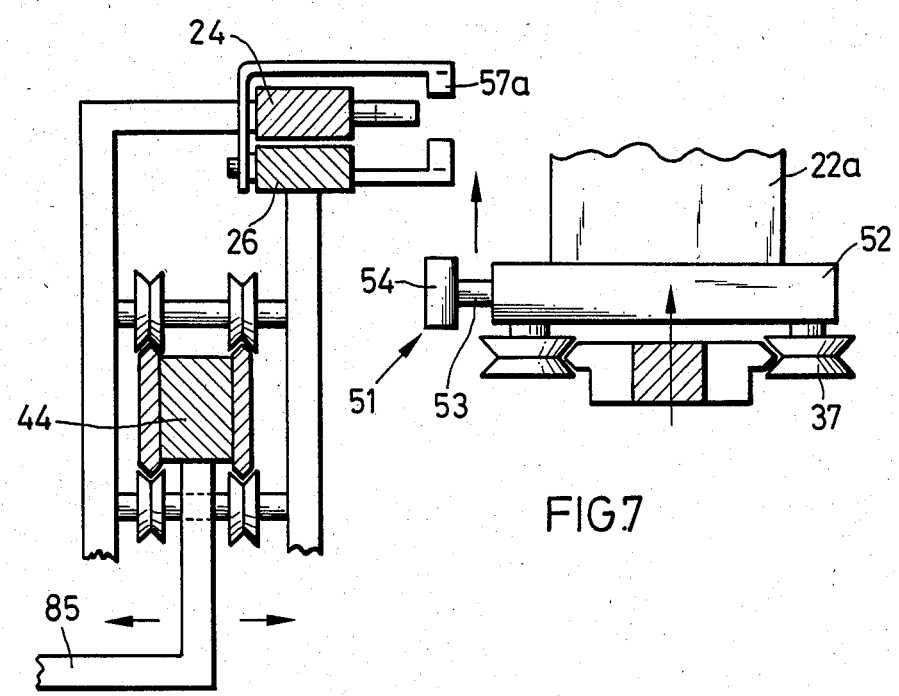
FIG. 7 shows a front view in which the components illustrated are in the position approximately as shown in FIG. 5.
Figure 8:
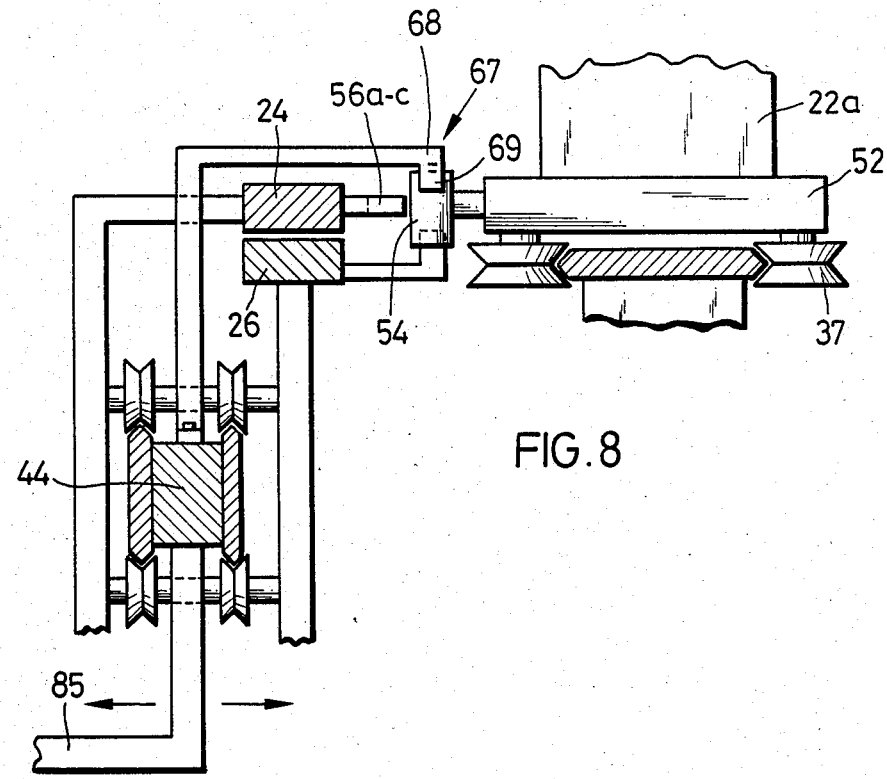
FIG. 8 shows a front view in which the components are in a position approximately as shown in FIG. 6.

It will be assumed that the article carriers 22a-22x with the articles 30 disposed thereon are conveyed on the upper guide track portion 20 from left to right, that is to say, in the direction indicated by the arrow 40, and all treatment stations of the apparatus are associated with the upper portion 20 and thus with the entrainment bars 24, 26 so that, on the lower guide track portion 21, the article carriers 22a-22x are moved from right to left, that is to say in the direction indicated by the arrow 41, so as merely to be returned to the starting position. At the end of their movement along the lower guide track portion, the article carriers are raised by the section 31 from the lower guide track portion 21 up to the level of the upper level guide track portion 20. In FIGS. 5 and 7, the movable section 31 with an article carrier 22a thereon is shown in the course of the upward movement, just below the upper guide track portion 20. At the time at which the upward movement of the movable section 31 is terminated, the entrainment bars 24-27 assume the position illustrated in FIG. 13A, in other words, the frame structure which includes the two entrainment bars 26 and 27 is disposed in the left-hand limit position whereas the frame structure comprising the two entrainment bars 24 and 25 is in its right-hand limit position. In the position occupied by the entrainment bar 26, the entrainment member 57a which is at the furthest left position thereon is disposed in the position indicated at I in which the article carrier 22a is also at the end of the upward movement of the movable section 31 (see FIGS. 6 and 8). The entrainment member 57a and the projection 51 of the article carrier 22a or the flange portion 54 thereof are so arranged relative to each other, with the components in the above-indicated position, that movement of the unit comprising the entrainment bars 24-27 in the direction indicated by the arrow 64 in FIG. 1 causes the entrainment member 57a and the flange 54 to come into engagement with each other. In the case illustrated in the drawing, the entrainment member 57a, unlike the entrainment members 57b and 57c of the entrainment bar 26, is similar in structure to the restraining element 67. In other words, it represents a downwardly open fork configuration which terminates above the web portion 53 of the projection 51. In that way, it is possible for the unit which includes the entrainment bars 24-27 already to occupy the position of being advanced in the direction of the arrow 64 shown in FIG. 1 and thus of being towards the portions 20 and 21, when the article carrier 22a, at the end of the upward movement of the movable section 31, moves into the position indicated at I at the level of the guide track portion 20 (see FIGS. 6 and 8) so that, in the course of that upward movement (see FIGS. 5 and 7), the flange 54 of the projection 51 associated with the article carrier 22a comes into engagement with the entrainment member 57a. Immediately after reaching position I or the condition shown in FIGS. 6 and 8, the two frame structures 26, 27 and 29, and 24, 25 and 28 respectively, are displaced in opposition to each other, in which case the frame structure 26, 27 and 29, therefore also including the entrainment bar 26, moves in the direction indicated by the arrow 40 while the frame structure 24, 25 and 28 moves in the direction indicated by the arrow 41, until the frame structures reach the final position shown in FIG. 13B, in which the article carrier 22a is at station II in which the entrainment member 57a of the entrainment bar 26 and the entrainment member 56a which is at the furthest left position on the entrainment bar 24 are disposed in mutually opposite relationship. They initially take up the relative position with respect to each other, which is shown for example in FIGS. 1 and 12 of the accompanying drawing, but with the difference that the entrainment member shown therein, on the entrainment bar 26, is reversed in its arrangement and represents an upwardly open fork configuration. Immediately after reaching station II, the unit which includes the components 24, 26, 27 and 25 is displaced in the direction indicated by the arrow 64, with the result that the entrainment member 56a on the entrainment bar 24 now comes into engagement with the flange 54. At the same time, the entrainment member 57a is moved into an inoperative position which corresponds to the position shown in FIG. 9 in the drawing, in which it is outside the path of movement of the projection 51.

In the subsequent movement of the two frame structures 24, 25, 28 and 26, 27, 29 respectively in the directions indicated by the arrows 40 and 41, the article carrier 22a is displaced by the entrainment member 56a into the station indicated at III, while at the same time the entrainment member 57a moves back, in an empty condition, to station I. In station III, the entrainment member 56a of the entrainment bar 24 and the entrainment member 57b of the entrainment bar 26 are now in mutually oppositely disposed relationship, as can be seen from FIG. 13A. Movement of the unit in the direction of the arrow 65 in FIG. 1 now provides that the entrainment member 56a comes out of engagement with and at the same time the entrainment member 57b comes into engagement with the flange 54 so that the resulting positions correspond to those shown in FIGS. 1 and 12. In the course of the subsequent movement of the entrainment bar 26 in the direction indicated by the arrow 40, in which at the same time the entrainment bar 24 is moved in the opposite direction, as indicated by the arrow 41, the article carrier 22a moves into station IV, whereby at the end of the two movements the entrainment member 57b on the entrainmnent bar 26 and the second entrainment member 56b on the entrainment bar 24 are disposed in mutually opposite relationship. By movement of the structural unit in the direction indicated by the arrow 64 in FIG. 1, the flange 54 is released from the entrainment member 57b and at the same time the entrainment member 56b is brought into engagement with the flange 54. In the course of the following movement of the entrainment bar 24 in the direction indicated by the arrow 40, the article carrier 22a moves into station V (see FIG. 13A).

In the embodiment illustrated in FIGS. 13A and 13B, the conveying movement through the transfer stations II–IV takes place in such a manner that in each case a transfer occurs from an entrainment member on the entrainment bar 26 to an entrainment member on the entrainment bar 24 and vice-versa; in other words, the residence time in the individual transfer stations does not need to be longer than is necessary in order in each case to perform the movements of the unit in the directions indicated by the arrows 64 and 65, thus, in consequence producing a substantially sinusoidal motion. In the embodiment illustrated in the drawings, the situation is different at the transfer station V insofar as at that location the entrainment member 56b on the entrainment bar 24 does not have a corresponding entrainment member on the entrainment bar 26 disposed opposite thereto. In other words, after release of the article carrier 22a by corresponding movement of the structural unit in the direction indicated by the arrow 65 in FIG.

1, in contrast to the situation in the preceding stations II–IV, the article carrier is not taken over by another entrainment member. Accordingly, in the subsequent movement of the two frame structures 24, 25, 28 and 26, 27, 29 in the directions indicated by arrows 41 and 40 respectively, the article carrier 22a remains in the station V. At the end of that stroke movement of the entrainment bar 24 in the direction of the arrow 41, the entrainment member 56c thereon passes into station V (see FIG. 13B) where, by displacement of the structural unit in the direction indicated by the arrow 64 in FIG. 1, it is brought into engagement with the article carrier 22a or the flange 24 thereof. It is only in the subsequent return stroke movement of the entrainment bar 24 in the direction of the arrow 40 that the article carrier 22a continues its conveying movement into the station VI (see FIG. 13A) in which once again an entrainment member 57c on the entrainment bar 26 of the other frame structure is disposed in a position in which, after displacement of the unit in the direction indicated by the arrow 65 and release of the flange 54 by the entrainment member 56c, it engages the entrainment member 57c. The subsequent movement of the entrainment bar 26 in the direction indicated by arrow 40 moves the article carrier into station VII in which, once again after a stroke movement of the entrainment bar 24 in the opposite direction as indicated by the arrow 41, the last entrainment member 56c thereon is disposed in opposite relationship to the flange 54 of the article carrier 22a so that further transverse movement of the structural unit in the direction indicated by the arrow 64 in FIG. 1 now moves the entrainment member 56c into engagement with the flange 54, simultaneously releasing same from the entrainment member 57c of the entrainment bar 26. In the following stroke movement of the latter in the direction indicated by arrow 40, the article carrier 22a moves into station VIII. FIG. 13A shows that there, a situation corresponding to the station V is such that no entrainment member on the entrainment bar 26 is disposed opposite to the article carrier 22a at the end of the movement of the entrainment bar 26 in the direction indicated by the arrow 41 so that, after the article carrier has been released by displacement of the structural unit in the direction indicated by the arrow 65 (see FIG. 1), it is not taken over by another entrainment member. That is to say, in the following stroke movements of the bars 24 and 26 in the directions indicated at 41 and 40 respectively, the article carrier 22a remains the station VIII. At the end of the above-mentioned stroke movement, the last entrainment member 56e on the bar 24 is in station VIII (see FIG. 13B). Further displacement of the entire system in the direction of the arrow 64 causes the entrainment member 56e to be brought into engagement with the article carrier 22a or the flange 54 thereof so that, in the following stroke movement of the bar 24 in the direction indicated by arrow 40, the article carrier 22a is moved into station IX in which it is disposed on the second movable section 32 which can be moved back downwardly to the level of the lower guide track portion (see FIG. 4).

In the transfer stations II, III, IV, VI and VIII, at the moment at which the article carrier is released by the entrainment member which had been in operation in the preceding step in the conveying movement, the article carrier is taken over by the entrainment member which produces the following step in the conveying motion. In other words, the article carrier is never free and thus uncontrolledly movable in the above-mentioned transfer stations. As that condition is not fulfilled in stations V and VIII, those stations have the above-mentioned restraining elements 67 which, at the moment at which the article carrier is released by the respective entrainment member 56b or 56d respectively, are brought into engagement with the flange 54 of the article carrier 22a and secure it in its position until further conveying movement of the article carrier 22a is produced in the course of the next-but-one conveying stroke movement. In that case, the article carrier is released by the restraining element 67 at the moment at which the respective entrainment member 56c or 56e which produces the following conveying stroke movement is brought into engagement with the flange 54.

In the above-described embodiment, the stepwise forward conveying movement of the article carriers 22a–22x is produced in two different ways, more specifically, on the one hand by direct transfer of each article carrier from the entrainment member of the one entrainment bar to the entrainment member of the other bar which co-operates therewith so that in each stroke movement which is performed in opposite directions by the two entrainment bars, the article carrier is moved on by a stepping motion which corresponds to the magnitude of the stroke movement performed by the entrainment bars. On the other hand, two successive steps in the conveying movement can be produced by two successive entrainment members on the same entrainment bar so that the article carrier remains in its position during the stroke movement of that bar in the opposite direction to the direction of conveyance. In that way, it is possible for the conveying movement of the article carrier with the article thereon through the apparatus to be adapted to the respective requirements involved. It is only necessary for the entrainment members to be suitably arranged on the entrainment bars. Thus, the spacing between the two entrainment members 56b and 56c, and 56d and 56e respectively, is only half as large as the case where the conveying stepping movements of the article carrier occur in direct succession and therefore without any interruption which is longer than is required for release of the article carrier by one entrainment member and engagement thereof by the other entrainment member. Therefore, the apparatus can be adapted to all situations of need that may arise, by suitable displaceable mounting of the entrainment members. Thus, in the embodiment described hereinbefore, the arrangement may be such for example that, during the conveying movement from station III to station IV and from station VI to station VII, the article or object 30 is printed upon or decorated in some other fashion, while in stations V and VIII, the print which has been previously applied to the article is dried, for example using UV-radiant heaters. The articles can be readily printed upon, during a step in the conveying movement. That even affords the advantage of taking up a smaller amount of time. On the other hand, it is simpler and more desirable for the drying operation to be carried out in relation to the article when it is at rest, which of course does not exclude the possibility of the article being rotated about its axis during the dryng operation. The described apparatus in accordance with the invention affords the possibility of providing the optimum conditions in each situation, for the individual treatment operations to be carried out.

In the above-described embodiment, the lower portion 21 of the guide track is only provided for transporting the article carriers back to their starting position, in the direction indicated by the arrow 41. In that connection, the articles can be picked up in station I by the respective article carrier thereat and can be removed from the article carrier in station IX. It will be appreciated that it is also possible for the articles to be introduced into the article carriers while already in the lower guide track portion 21, with the articles being removed only following station IX, that is to say also in the region of the lower portion 21 or during the downward transportation movement by means of the movable section 32.

Conveying movement in the region of the lower guide track portion 21 is effected by the two entrainment bars 27 and 25. FIGS. 13A and 13B show that the entrainment members 58a, 58b, 58c and 58d on the bar 27 and the entrainment members 59a, 59b, 59c and 59d on the bar 25 are so arranged that in each transfer station, there occurs direct transfer from the entrainment member on one bar to the entrainment member on the other bar and vice-versa; in that connection, with respect to the direction of conveying movement in the upper guide track portion, the return stroke movement of the entrainment bars is respectively utilised for conveying the article carriers in the direction indicated by arrow 41. There is therefore no station in which the article carrier remains during the period of a stroke movement so that the number of article carriers required for a given situation of use can be kept as small as possible. The two lower entrainment bars 27 and 25 and the entrainment members thereon co-operate in the same manner as described in relation to the upper two bars 24 and 26.

It will be appreciated that it is possible for the articles to be subjected to treatment operations in the region of the lower guide track portion 21. In that case, the articles would still remain on the article carrier after stations IX and would be removed only in the lower guide track portion 21, but possibly also only in the upper portion 20. The use of the lower guide track portion for carrying out further treatment operations on the articles presents itself as a possibility in particular when the apparatus is of a one-sided design, being therefore constructed in the manner shown in FIG. 1, wherein the article 30 to be treated is supported by the holding member 38 only from one end, because in that case the conveyor path and the means in the treatment stations are accessible from the side. However, it is also possible and advantageous to use the lower guide track portion for carrying out treatment operations on the articles when there are two apparatuses which are in mutually oppositely disposed relationship, as shown in FIG. 14, which support the article to be treated from both sides. In the ultimate analysis, for the purposes of also carrying out treatment operations on articles in the lower guide track portion 21, it is only necessary to provide a sufficiently large vertical distance between the two portions 20 and 21. The expenditure that that involves is not of great weight.

The embodiment shown in FIG. 14, to which reference has already been made above, merely represents duplication of the above-described embodiment as shown in FIGS. 1 to 13A and 13B, with the exception that the motor 170a of the unit 118 which is on the right is also used for driving the unit 119 which is on the left. For that purpose, the output shaft 179a of each of the two transmission units 179 which are disposed at the ends of the right-hand unit 118 are extended and connected to the respectively corresponding transmission 179b of the left-hand unit 119 so that the central transmission arrangement 170 of the unit 119 is also driven by way of the cardan shafts 178 of the unit 119. In addition, as shown in FIG. 14, the shaft 182a may extend across both units 118 and 119, although that is not absolutely necessary. It is also possible for the two article carriers 120 which each jointly carry a respective article 130 to be joined together by a transverse member 190 which is shown in broken lines in FIG. 14 of the drawing, although that is not necessary, having regard to the positively synchronised conditions produced by the drive transmission means.

Figure 15:
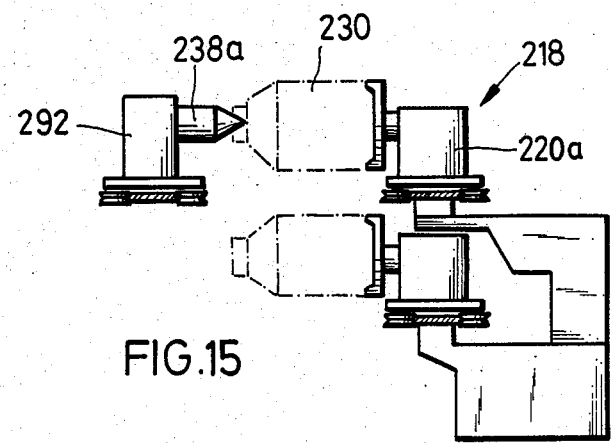
FIG. 15 shows a simplified front view of another embodiment.
Figure 16:
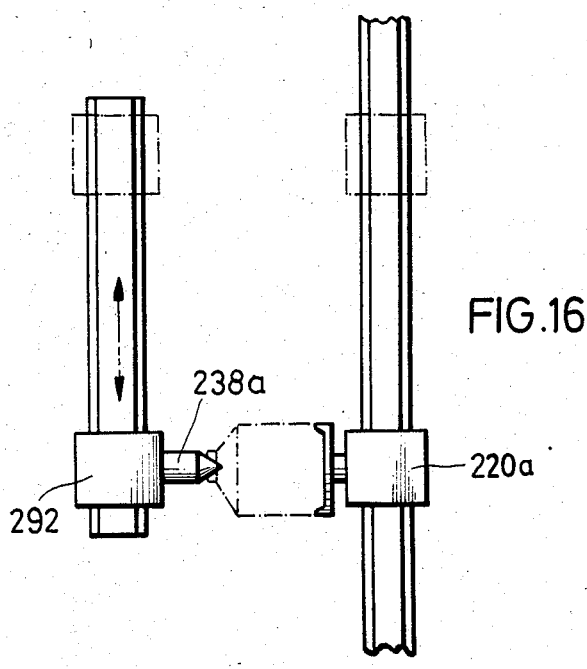
FIG. 16 shows a plan view of the FIG. 15 structure.

In the embodiment illustrated in FIGS. 15 and 16, there is only one unit 218 which is only shown in diagrammatic form, but the articles 230 to be decorated may also be supported at the other, oppositely disposed side in the station in which the article is subjected to a force which exceeds a given value, for example when the article is being printed upon or labelled. For that purpose, associated with each such station is an additional holding member 238a which is carried by a carriage 292 which is movable only in the region of that station; the carriage 292 is movable synchronously with the respective article carrier 220a which is in the treatment station, when the holding member 238a engages the article 230. At the end of the respective treatment step carried out on the article 230, the holding member 238a is retracted out of the article 230 and moved back into its starting position, with the carriage 292. At its starting position, the holding member 238a is moved into engagement with the next following article 230 by suitable displacement of the holding member.

When the apparatus is used as a screen printing machine, the drives for a screen printing stencil 95 and a squeegee member 96 (see FIG. 14) may also be derived from the reciprocatingly movable carriage 74. That also applies in regard to the gear 97 which produces the rotary movement of the article 30 which is to be printed upon or labelled, and also in regard to another component which produces movement of the article about its axis or an axis parallel thereto. The carriage may for example drive a gear rack 98 which is arranged in each printing station or the like and which meshes therein with a gear 97 of the respective article carrier that is disposed in that station.

It will be appreciated that the apparatus in accordance with the present invention is also suitable for printing, labelling or the like on flat or irregularly shaped articles or objects.

Deviating from the condition shown in the drawings, the guide track portions 20 and 21 do not necessarily need to extend parallel to each other. On the contrary, it is possible for one or both of the portions 20 and 21 to extend at an inclined angle relative to the horizontal. The movable sections which make the communication between the two portions 20 and 21 may also possibly be moved in two or more conveying stepping movements. That may be desirable for example when the articles are each introduced into an article carrier which is disposed on one of the above-mentioned movable sections. A similar point also applies in regard to removal of the articles after treatment thereon has been finished, from the respective article carrier.

It is also possible for the directions of movement to be reversed, for example in such a way that the article carriers on the lower guide track portion are moved in the direction indicated by the arrow 40 while those on the upper guide track portion are moved in the direction indicated by the arrow 41, possibly with the consequence that the treatment stations are associated only with the lower portion 21. In any case, that arrangement still remains the major advantage of the apparatus in accordance with the present invention, namely that each article carrier retains its absolute position on both guide track portions and also on the movable sections which interconnect same. In other words, in the embodiments illustrated in the drawings, the article is always accessible from above and accordingly the treatment stations are also disposed in the lower guide track portion, above the article carrier. That is an important advantage over the known apparatuses which have circulating chains and in which the position of the article carriers is reversed in the lower run of the chain, in comparison with the position thereof in the upper run of the chain, so that for that reason alone major difficulties are encountered in associating treatment stations with the lower run of the chain. The advantage which is achieved by the apparatus of the invention, in comparison with that known arrangement, makes a substantial contribution to the versatility of use thereof and also the adaptability of the apparatus.

Figure 17:
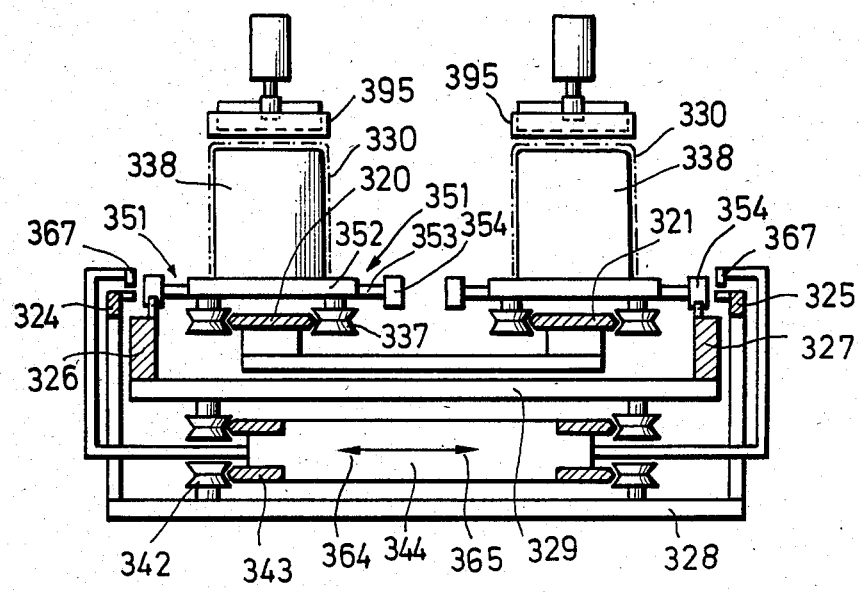
FIG. 17 shows a diagrammatic front view in partial section of yet another embodiment.

The latter consideration also applies in regard to the embodiment shown in FIG. 17, which in substance corresponds to the embodiment shown in FIG. 1, if the FIG. 1 embodiment is turned through 90° and the two guide track portions 20 and 21 are additionally pivoted through 90°, so that they retain their position in a horizontal plane. The reference numerals used in FIG. 17 correspond to those used in FIG. 1, but increased in each case by 300. The important difference between the FIG. 17 embodiment and all the other embodiments of the invention as described hereinbefore is that the two guide track portions 320 and 321 do not extend one beneath the other but one beside the other in the same horizontal plane, with the result that the movable transfer sections which are not shown in FIG. 17 but which are disposed at the ends of the guide track portions 320 and 321 and which respectively bridge across the gap between the two portions 320 and 321 are movable with their reciprocating action in a horizontal plane.

Another difference in relation to the embodiment shown in FIG. 1 is that the base plates 352 of the article carriers are provided at both mutually opposite sides with projections or extension portions 351 which are engaged by the entrainment bars 324, 326 and 325, 327 respectively. That mode of operation arises out of the selected structural design, wherein the entrainment bars each externally engage the plate portions 352 of the article carriers or the projections 351 disposed therein. A similar consideration also applies in regard to the locking or restraining elements 367. In other words, the mode of co-operation of the bars 324–327 and the restraining elements 367 with the projections 351 is as described in relation to the embodiment shown in FIG. 1.

Another difference in the FIG. 17 embodiment over the FIG. 1 embodiment is that the holding members 338 for the articles 330 to be treated are mounted directly to the respectively associated base plate portion 352 so that the end faces of the articles 330 which are to be printed upon, which end faces may be cylindrical, face upwardly and are printed upon by a flat surface printing operation. It will be appreciated that it is also possible for the article carriers to be designed in a similar fashion to the construction shown in FIG. 1 and to be provided with laterally disposed, possibly rotatable holding members which make it possible to print on articles which can be rolled against the screen printing stencils indicated at 395.

In the embodiment illustrated in FIG. 17, the two guide track portions 320 and 321 have printing stations associated therewith. It should be appreciated that it is also possible in this case for the printing stations to be associated with only one of the two guide track portions 320 and 321, with the article carriers merely being returned on the other guide track portion, and possibly being subjected to other additional treatment operations thereon. If one of the two guide track portions 320 and 321 serves only for the return movement of the article carriers, then there is no need to provide a particular restraining element on that guide track portion, in a similar fashion to FIG. 1.

It is also possible for the two guide track portions 320 and 321 to be disposed in lateral juxtaposition, but also displaced in respect of height relative to each other, in such a way that one of the two guide track portions is at a higher level that the other. That may be desirable for example when the apparatus is only accessible from one side in operation thereof. If the portions 320 and 321 were arranged in that way, the movable sections which bridge across the gap between the two guide track portions would also have to have a suitable vertical component in their path of movement.

In order to achieve improved accessibility, it may also be desirable for at least one pair of entrainment bars as indicated at 324, 326 and 325, 327 respectively to be disposed between each of the two guide track portions 320 and 321. A similar construction may also apply in regard to the restraining element 367. If only one pair 324, 326 and 325, 327 of entrainment bars is arranged between the respective guide track portions 320 and 321, then the projections 351 which co-operate with the entrainment bars only need to be provided at one side of the base plate portions 352 of the article carriers.

It will be appreciated that the embodiments described above are given only by way of example of the present invention, and that various alterations and modifications may be made therein without departing from the scope of the invention.

What is claimed is:

1. Apparatus for decorating articles, comprising:
at least one treatment station for the articles to be treated therein;
a guide track means comprised of at least two generally parallel spaced portions extending through said at least one station;
a plurality of article carriers for carrying respective articles along said guide track means and through said at least one station for treatment therein;
two generally parallel elongated conveyor means, each conveyor means having a plurality of engaging members adapted to engage the article carriers; and
reciprocating means cooperating with the two conveyor means for cyclically moving each of the conveyor means substantially parallel to the respective guide track portion, the conveyor means moving in opposite directions to provide for stepwise conveyance of said article carriers along said respective guide track portions, said conveyor means also being reciprocally movable transversely with respect to the guide track portions between an active position in which said engaging members respectively engage said article carriers and an inactive position in which said engaging members are out of engagement with said article carriers.

2. Apparatus as set forth in claim 1 wherein each conveyor means includes at least one entrainment bar which is substantially parallel to the respective guide track portion and wherein one entrainment bar upon movement in the one direction is in engagement with article carriers of the one guide track portion and the other entrainment bar upon movement in the other direction is in engagement with article carriers of the other guide track portion.

3. Apparatus as set forth in claim 2 wherein associated with each guide track portion are two entrainment bars movable in opposition relative to each other.

4. Apparatus as set forth in claim 3 wherein said two oppositely movable entrainment bars of each said guide track portion are arranged one above the other.

5. Apparatus as set forth in claim 3 including connecting elements inter-connecting the entrainment bars of the two guide track portions, which are in operation respectively moved in the same direction at the same time.

6. Apparatus as set forth in claim 5 including a support element adapted to carry said entrainment bars and connecting elements, and a drive means operatively engaging said support element for producing said reciprocating movements in the transverse directions.

7. Apparatus as set forth in claim 2 wherein each said article carrier is provided with a projection engageable by said at least one entrainment bar.

8. Apparatus as set forth in claim 2 wherein each entrainment bar carries a plurality of entrainment members, at least some of which are mounted to the respective entrainment bars at spacings from each other that correspond to the stoke length of said parallel reciprocating movement performed by the respective entrainment bar.

9. Apparatus as set forth in claim 2 wherein each entrainment bar carries a plurality of entrainment members, at least some of which are mounted to the respective entrainment bars at spacings from each other that correspond to double the stroke length of said parallel reciprocating movement performed by the entrainment bars.

10. Apparatus as set forth in claim 2 wherein each entrainment bar carries a plurality of said entrainment members and the entrainment members of the entrainment bars respectively operatively associated with the same said guide track portion are of different lengths parallel to said reciprocating movements of said bars in said transverse directions, the shorter entrainment members being engaged with a projection on a respective said carrier in the limit position in which the said entrainment members are advanced towards the article carriers and the longer entrainment members being engaged with the respective projection in the opposite limit position.

11. Apparatus as set forth in claim 1 including in the at least one station at which said article carriers stop, between two conveying stepping movements thereof, for the duration of a said stepping movement, a restraining means for securing the article carrier in its stopped position.

12. Apparatus as set forth in claim 1 wherein each said article carrier is operable to support the respective articles to be treated, only at one side thereof, and further including at said at least one treatment station a reciprocally movable support means operable during the treatment operation carried out on an article at said station also to support said article at the other side thereof, wherein said support means in movement thereof in the direction of the article to be supported thereby, moves synchronously therewith.

13. An assembly for decorating articles, comprising first and second apparatuses as set forth in claim 1 and operable to decorate articles which are held at both sides, which apparatuses are disposed at a spacing from each other in mutually oppositely disposed relationship.

14. A method for conveying a succession of articles to be decorated through at least one treatment station in a series of stepwise movements to allow adjustability in conveying motion and residence times, said method comprising positioning each said article on a respective article carrier, reciprocally moving one conveyor means in the direction of said conveying and another conveyor means in the opposite direction of said conveying, and moving the conveyor means transversely with respect to the direction of said conveying for releasably connecting each said carrier to one of said conveyor means where by each said carrier is connected to said conveyor means during selected reciprocations to effect stepwise movements in the direction of conveying or the opposite direction and is disconnected from each of said conveyor means for desired residence times at a fixed location.

15. A method according to claim 14 wherein each said article is retained on its respective carrier throughout the conveying of said articles through said at least one treatment station.

16. A method according to claim 14 wherein said carrier is restrained from movement when stopped between two successive stepwise movements.

17. A method according to claim 14 wherein the movement of the carrier is substantially horizontal.

18. A method according to claim 17 wherein the conveyor means are parallel to and at the same general horizontal level as at least a portion of the carrier.

* * * * *